United States Patent [19]

Krause

[11] 4,305,903

[45] Dec. 15, 1981

[54] COMPOSITE FIBER REINFORCED MEMBER AND METHOD
[75] Inventor: Charles J. Krause, Nicholasville, Ky.
[73] Assignee: Norris Industries, Inc., Ypsilanti, Mich.
[21] Appl. No.: 124,353
[22] Filed: Feb. 25, 1980
[51] Int. Cl.³ .......................... B29D 3/02; B29D 9/20
[52] U.S. Cl. ................................... 264/258; 264/259; 264/320
[58] Field of Search ...................... 428/273, 285, 431; 264/258, 255, 259, 320, 322

[56] References Cited

U.S. PATENT DOCUMENTS

| | | | |
|---|---|---|---|
| 2,695,178 | 11/1954 | Rheinfrank | 428/161 |
| 2,936,487 | 5/1960 | Paz | 164/108 |
| 3,018,267 | 1/1962 | Steckler et al. | 428/431 |
| 3,056,709 | 10/1962 | Rising et al. | 428/148 |
| 3,184,527 | 5/1965 | Fisher | 264/255 |
| 3,256,125 | 6/1966 | Tyler | 156/184 |
| 3,349,157 | 10/1967 | Parsons | 264/255 |
| 3,408,239 | 10/1968 | Wedin | 156/62.8 |
| 3,476,625 | 11/1969 | Slivinsky et al. | 156/86 |
| 3,530,212 | 9/1970 | Kienle et al. | 264/137 |
| 3,657,040 | 4/1972 | Shobert | 264/137 |
| 3,664,909 | 5/1972 | Ackley | 428/293 |
| 3,745,140 | 7/1973 | Segal | 260/40 R |
| 3,778,334 | 12/1973 | Sturgeon | 428/285 |
| 3,812,077 | 5/1974 | Hobbs | 428/392 |
| 3,843,759 | 10/1974 | Keeham | 264/135 |
| 3,850,723 | 11/1974 | Ackley | 264/136 |
| 3,881,977 | 5/1975 | Dauksys | 264/137 |
| 3,881,978 | 5/1975 | Livingston et al. | 264/136 |
| 3,895,896 | 6/1975 | White et al. | 425/93 |
| 3,903,343 | 9/1975 | Pfaff | 428/168 |
| 3,956,446 | 5/1976 | Eirich et al. | 264/117 |
| 3,962,506 | 6/1976 | Dunahoo | 428/158 |
| 3,966,523 | 6/1976 | Jakobsen et al. | 156/169 |
| 3,966,864 | 6/1976 | Stenzenberger | 264/137 |
| 3,969,177 | 7/1976 | Doran et al. | 428/273 |
| 3,972,765 | 8/1976 | Kondo et al. | 428/273 |
| 3,974,012 | 8/1976 | Hogarth | 156/161 |
| 3,975,483 | 8/1976 | Rudloff | 264/137 |
| 3,975,492 | 8/1976 | McLean et al. | 264/263 |
| 4,009,043 | 2/1977 | Preis | 260/37 N |
| 4,031,181 | 6/1977 | Schaefer et al. | 264/135 |
| 4,039,006 | 8/1977 | Inoue et al. | 428/36 |
| 4,041,599 | 8/1977 | Smith | 29/451 |
| 4,051,290 | 9/1977 | Jutte et al. | 428/168 |
| 4,052,360 | 10/1977 | Berardinelli et al. | 260/40 R |
| 4,052,499 | 10/1977 | Goupil et al. | 264/265 |
| 4,067,852 | 1/1978 | Calundann | 260/40 R |
| 4,088,525 | 5/1978 | Gowetski et al. | 156/173 |
| 4,089,190 | 5/1978 | Worgan et al. | 64/2 R |
| 4,106,797 | 8/1978 | Michael | 285/156 |
| 4,107,128 | 8/1978 | Hosoi et al. | 260/40 R |
| 4,110,302 | 8/1978 | Thomas et al. | 260/40 R |
| 4,116,922 | 9/1978 | Hornbaker et al. | 260/40 R |
| 4,119,748 | 10/1978 | Verbaushede et al. | 428/36 |
| 4,124,652 | 11/1978 | Quinn et al. | 260/40 R |
| 4,125,571 | 11/1978 | Scott et al. | 528/302 |
| 4,125,572 | 11/1978 | Scott | 528/307 |
| 4,137,215 | 1/1979 | Van Gasse | 260/40 R |
| 4,141,882 | 2/1979 | Kodama et al. | 260/37 EP |
| 4,155,305 | 5/1979 | Heissler et al. | 156/172 |
| 4,157,325 | 6/1979 | Charles et al. | 260/40 R |
| 4,160,005 | 7/1979 | Renkowsky | 264/137 |
| 4,163,002 | 8/1979 | Pohl et al. | 528/274 |
| 4,163,003 | 7/1979 | Paul, Jr. et al. | 260/40 R |
| 4,168,259 | 9/1979 | Coleman | 525/176 |
| 4,171,626 | 10/1979 | Yates et al. | 64/1 S |
| 4,172,175 | 10/1979 | Pearson et al. | 428/376 |
| 4,173,670 | 11/1979 | Van Auken | 428/36 |
| 4,177,306 | 12/1979 | Schulz | 428/107 |

*Primary Examiner*—W. E. Hoag
*Attorney, Agent, or Firm*—Harness, Dickey & Pierce

[57] ABSTRACT

A composite fiber reinforced plastic member and its method of manufacture to provide a high-strength lightweight part particularly suitable for use as a structural component. The composite member comprises a body or web comprised of a glass fiber reinforced thermosetting resin matrix having a carbonized fiber reinforced compatible resin stratum integrally bonded by the resin matrix over selected areas thereof corresponding to areas of anticipated high stress. The component is produced by molding under pressure and heat a moldable assembly comprising a first sheet of a flowable heat curable resin containing glass fibers having one or a plurality of second sheets comprised of a compatible flowable heat curable resin containing carbonized fibers disposed over selected areas of the first sheet. During the compression molding operation, the resins in the first and second sheets flow to conform with and fill the mold cavity and the resins cure forming a smooth surfaced composite integral assembly of high strength.

13 Claims, 11 Drawing Figures

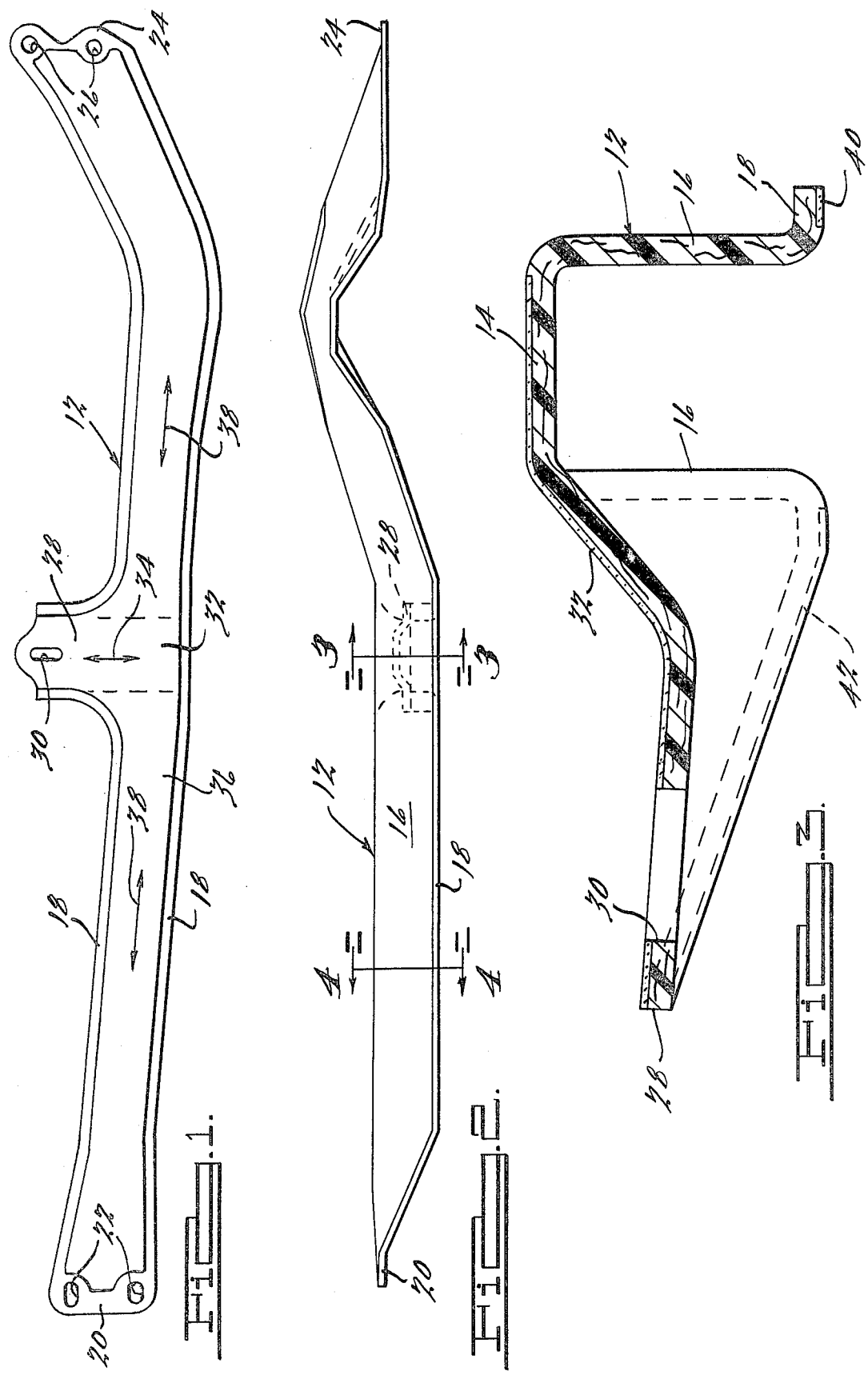

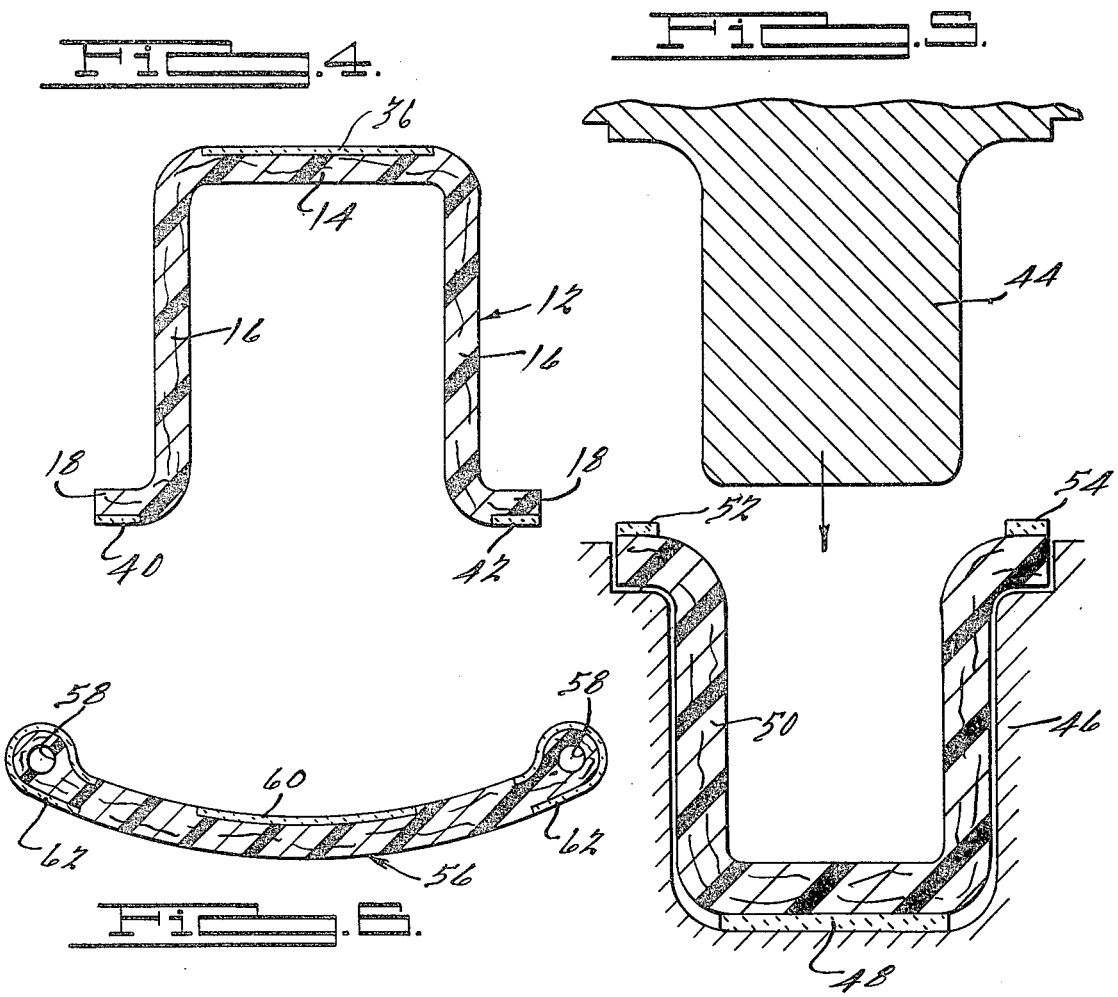

COMPOSITE FIBER REINFORCED MEMBER AND METHOD

BACKGROUND OF THE INVENTION

The use of components fabricated from fiber reinforced synthetic resins is receiving widespread acceptance in the aircraft, automotive, leisure products and industrial equipment industries. The selected use of such fiber reinforced synthetic resin components provides for significant weight reduction without sacrificing physical strength properties and durability. In the automotive industry in particular, attempts to improve fuel economy of automobiles and trucks has occasioned a replacement of various panels and structural members formerly comprised of steel with light-weight, high-strength components comprised of fiber reinforced plastics. Weight savings in many instances of as high as 70% are attainable without a sacrifice in durability, strength and operating performance.

It has been common practice to form such panels and structural components from sheet molding compounds (SMC) comprising a fiber mat or tape pre-impregnated with a partially cured flowable thermosetting resin which subsequently is compression molded with heat to effect a curing of the resin producing a finished article of the desired configuration. Thermosetting resins employed in the formation of sheet molding compounds or so-called "prepregs" include polyester resins, epoxy resins and polyimide resins of which polyester-type resins are most common. The fiber reinforcement conventionally comprises chopped glass fibers or continuous glass filaments which may be randomly oriented or directionally oriented to provide optimum strength properties of the final molded component. In many instances, such glass fiber reinforced plastics have exhibited inadequate strength in satisfactorily replacing steel counterparts or have necessitated the use of relatively thick sections to provide satisfactory strength resulting in an increased cost of the component and, in some instances, resulting in a physical size which cannot be accommodated in the space available.

In order to increase the strength of such fiberglass reinforced plastic components, it has heretofore been proposed to mix higher strength fibers or filaments with the glass fibers or glass filaments effecting a further reinforcement thereof. Fibers such as carbonized fibers, boron fibers, steel fibers, asbestos fibers, and the like, have been suggested of which highly carbonized or graphitized fibers are particularly suitable because of their exceedingly high-strength. Unfortunately, the use of such high-strength fibers or filaments such as graphite fibers alone or in combination with glass fibers substantially increases the cost of the fiber reinforced component detracting from a more widespread adoption thereof because of economic considerations. During the compression molding of such sheet molding compounds, trimming operations before and after the molding operation produce scrap which cannot be readily recycled further detracting from the economy of the operation.

The present invention overcomes the problems and disadvantages associated with prior art fiber reinforced plastics and methods of forming structural components therefrom in which the high cost high-strength fibers are strategically employed only in localized areas of anticipated high stress maximizing their contribution to high-strength and a corresponding reduction in weight and cost of the final product.

SUMMARY OF THE INVENTION

The benefits and advantages of the present invention in accordance with the method aspects thereof are achieved by providing a first sheet of a molding compound containing glass fibers and a flowable heat curable resin and one or a plurality of second sheets or tapes containing carbonized or high-strength fibers and a compatible flowable heat curable resin which are positioned over selected areas of the first sheet forming thereby a composite moldable assembly. The moldable assembly is positioned within a mold cavity of the desired configuration and is compression molded under pressure and heat to effect a flow of the resins to fill the mold cavity and a curing of the resins to integrally bond the first and second sheets together into an integral composite assembly. The first sheet preferably contains a mixture of chopped glass fibers and continuous glass filaments which are oriented in selected directions to maximize strength of the molded assembly. The second sheet or sheets preferably employ graphite fibers which are disposed unidirectionally and are positioned and oriented to maximize their reinforcement of the integral composite assembly in accordance to the loading to which the molded assembly is to be subjected during service. Preferably, the resin matrix of both the first and second sheet comprises a polyester-type thermosetting resin.

In accordance with the article aspects of the present invention, a high-strength, low-weight composite fiber reinforced article is provided comprising a member consisting of a first web comprised of a cured thermosetting resin incorporating glass fibers therein having integrally bonded over one or more selected localized areas thereof, a surface stratum comprised of a cured compatible thermosetting resin having high-strength graphite fibers in the resin matrix thereof. The integrally molded composite fiber reinforced component is characterized as maximizing strength at minimum cost and which can be economically manufactured employing conventional compression molding techniques.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a plan view of a transmission support member for use in automobiles embodying the principles of the present invention;

FIG. 2 is a side elevational view of the transmission support member shown in FIG. 1;

FIG. 3 is a magnified transverse sectional view of the transmission support member shown in FIG. 2 and taken substantially along line 3—3 thereof;

FIG. 4 is a magnified transverse sectional view of the transmission support member shown in FIG. 2 and taken substantially along line 4—4 thereof;

FIG. 5 is a fragmentary transverse sectional view of a typical mold and die assembly for fabricating a composite fiber reinforced structural member; and FIGS. 6 through 11 are illustrations of alternative structural members of a composite fiber reinforced construction which can be fabricated in accordance with the practice of the present invention.

DESCRIPTION OF THE PREFERRED EMBODIMENTS

The glass fiber containing sheet molding compound and the carbon or graphite fiber sheet molding compound or tape suitable for use in the practice of the present invention may comprise any of those molding compounds commercially available containing the desired thermosetting resin and the requisite fiber content and disposition. The molding compounds include a flowable heat-curable thermosetting resin including polyester resins, epoxy resins, phenolic resins, alkyd and diallyl phthalate resins, silicone resins, melamine resins, urethane resins or the like. Of the foregoing, polyester-type resins are particularly suitable because of their comparatively low cost providing a good balance of mechanical properties and chemical resistance as well as dimensional stability and ease of handling. For this reason, the use of a polyester resin matrix in the glass fiber and carbon fiber sheet molding compound constitutes a preferred practice. It is important that the resin employed in the glass fiber molding compound and the graphite fiber molding compound be compatible in order to form an integral resin matrix during the hot compression molding of the composite moldable assembly achieving thereby the requisite high-strength of the cured article. It is, accordingly, preferred to employ substantially the same polyester resin in both molding compounds to achieve interdiffusion at the surfaces of the graphite fiber compound and glass fiber compound during the molding operation.

The glass fiber containing molding compound may incorporate chopped glass fibers of relatively short length or may comprise continuous glass filaments or rovings of glass filaments disposed in an oriented position. The glass fiber sheet molding compound may contain up to as high as 85% by weight glass fibers depending on the degree of orientation with amounts of about 70 to about 80% by weight being typical. Particularly suitable compounds are those available from PPG Industries under the brand name XMC which contain continuous glass reinforcements in the form of either rovings or filaments alone or in further combination with chopped randomly oriented glass fibers. Such molding compounds contain from about 70 to about 75% by weight glass with the balance comprising an isophthalic polyester resin in an amount of 90 parts by weight, 10 parts by weight of a reactive styrene monomer, 0.5 part zinc stearate, 1 part catalyst and about 3 parts of a thickener filler. The specific quantity of continuous filaments or rovings of glass in the molding compound relative to the quantity of randomly oriented chopped glass fibers can be varied consistent with the physical properties desired in the final composite molded article. Since the XMC brand sheet molding compounds are produced by helically winding a continuous filament or roving on a mandrel, such compounds are characterized by the specific helix angle of the continuous filaments which can be varied to achieve optimum mechanical properties.

The resin may additionally contain supplemental agents including various metal oxide particulated fillers for controlling the flow characteristics of the resin impregnant and to provide dimensional stability. Th fiber surfaces may also be pretreated to improve wettability and bondability to the resin matrix in accordance with the various techniques well known in the art. It will be understood that the particular resin chemistry and method of impregnation of the fibrous layer does not form a part of the present invention and may be accomplished in accordance with any of the techniques and technology well known in the art.

The carbon fiber reinforced molding compound or tape contains fibers derived from the pyrolysis of carbonaceous fibrous raw materials which do not melt and char to leave a high carbon residue. The most common precursor materials employed for producing carbon fibers are rayon and polyacrylonitrile fibers. It is preferred that carbon fibers which have been highly graphitized are employed in the molding compound due to their exceptionally high-strength and high modulus. The carbon or graphite fibers to the molding compound are preferably in the form of continuous filaments or yarns and may be woven or unidirectionally oriented to achieve the desired strength properties. Preferably, the graphite fibers are in the form of continuous filaments uni-directionally oriented and are applied to the glass fiber molding compound such that the fiber orientation is in the direction of maximum anticipated stress to which the molded article is to be subjected during ultimate service. Conventionally, the carbon fiber content of such molding compounds ranges from about 55 to about 75% by weight.

After impregnation, the sheet molding compounds are conventionally covered with suitable release films on the exposed faces thereof such as polyethylene film, for example, and may be refrigerated during storage prior to use. The resin constituent may be partially cured to reduce the fluidity thereof with final curing occurring during the compression molding operation. At the time of ultimate use, the sheet molding compounds are cut to size, the release films are removed, the compounds are placed in a mold cavity of the desired configuration and the composite moldable assembly is placed under heat and pressure whereby the flowable heat curable resin fills the mold cavity and is cured forming an integral composite fiber reinforced article. Conventionally, compression molding techniques employ pressures of about 1,000 psi and temperatures of about 300° F. for polyester-type resin systems requiring cure cycles of around 2 to about 3 minutes. Because of the extremely high-strength of the graphite fiber containing molding compound, only relatively thin sheets or tapes need be employed relative to the thickness of the glass fiber containing molding compound to achieve the requisite reinforcement. The stratum of the graphite fiber reinforced resin matrix in the cured article may range from about 1% up to about 50% of the total thickness of the component depending on the mechanical properties required. Typically, the cured graphite fiber/resin stratum in a final cured condition will have a thickness of about 0.003 to about 0.030 inch with the glass fiber containing cured resin layer comprising from about ⅛ up to about ½ inch or greater as required.

It will be appreciated from the foregoing, that substantial cost savings are attainable by the strategic use of the graphite fiber sheet molding compound which ranges from about 20 times to as high as 50 times the cost per pound of glass fiber molding compounds depending on the types and degree of orientation of the glass fibers and filaments therein. Moreover, the pre-trimming of the graphite fiber molding compound and positioning thereof in only selected high stress areas avoids any waste or scrap of this costly high-strength material providing further economies in the manufacture of composite components. Graphite fiber containing sheet molding compounds which have been found particularly suitable in the practice of the present invention are commercially available from Hercules Incorporated under the brand name "Magnamite".

Referring now in detail to the drawings, and as may be best seen in FIGS. 1-4 thereof, a typical composite fiber reinforced plastic structural member 12 is illustrated in a form suitable for use as a transverse transmission support bracket adapted to extend between and to be affixed to the side rails of an automobile chassis frame. As shown, the structural member 12 is of a generally hat-shaped cross section as illustrated in FIG. 4, comprising an upper horizontal flange 14 integrally connected to spaced side flanges 16 each having an outwardly extending base flange 18 formed along the lower edge portion thereof. The left-hand end of the member 12 as viewed in FIGS. 1 and 2 tapers to an end flange 20 formed with a pair of through-slots 22 for bolting or otherwise securing the member to a supporting frame such as the side rail of a vehicle frame (not shown). The right-hand end of the member 12 similarly tapers to a mounting flange 24 provided with a pair of through-bores 26 for securing the member to an adjacent supporting rail.

An integrally formed pad or transmission support arm 28 projects laterally and substantially centrally of the member and is formed with a slot 30 for accommodating a supporting bracket on a vehicle transmission. It will be apparent that the arm 28 when subjected to downward forces applied by the weight of the transmission support is subjected to a combination of bending, shear and torsional stresses and for this purpose, the upper surface of the arm is provided with a layer or stratum 32 of graphite fibers which are preferably uni-directionally oriented in the direction of the double-headed arrow indicated at 34 in FIG. 1. The upper surface of the flange 14 is provided with a layer 36 of graphite fibers extending to each side of the arm 28 which also are preferably uni-directionally oriented in a direction parallel to the side flanges 16 as indicated by the double-headed arrows 38 in FIG. 1. The layer 36 extends laterally from the area of the arm 28 a distance sufficient to provide the requisite reinforcement of the structural member and preferably terminates at a position spaced inwardly of the end flange 20 and mounting flange 24. The graphite stratum of layer 34 preferably overlaps the graphite stratum or layer 38 in the area of the arm 28 to provide optimum mechanical properties.

In accordance with a preferred practice of the present invention when relatively severe loading is imposed on the structural member 12, the lower surfaces of one of the base flanges 18 is provided with a graphite fiber reinforced layer or stratum 40 in which the fibers are uni-directionally oriented and extend in the same longitudinal direction as the fibers in the layer 36. Similarly, the lower surface of the other base flange including that portion extending outwardly along the side edges of the arm 28 is provided with a graphite fiber layer or stratum 42 to provide additional reinforcement. It is also contemplated, depending upon the specific loading and resultant high stress areas of the structural component when subjected to actual service, supplemental localized layers or strata of graphite fiber reinforced layers can be applied at such selected areas or embedded between or sandwiched between two overlying glass fiber containing resin matrices to achieve the requisite reinforcement as the case may be.

The structural member 12 as described in connection with FIGS. 1-4 can be produced by employing conventional compression molding techniques utilizing a heated mold or die set defining a mold cavity of the desired configuration. As shown in FIG. 5, a male mold section 44 is provided which is adapted to be mounted on a ram of a press (not shown) which is of a configuration corresponding to the inside surfaces of the member. A female mold section 46 of a corresponding contour is provided defining in combination a generally inverted U-shaped cavity when the mold is closed. A sheet or tape 48 containing high-strength graphite fibers trimmed to the desired size is placed in the female mold cavity by hand lay-up whereafter a sheet molding compound 50 containing glass fiber reinforcements of an appropriate trimmed size is placed thereover. Finally, strips or tapes 52, 54 of supplemental graphite fiber molding compound is placed along the upper edges of the fiberglass sheet molding compound layer 50 whereafter the mold is closed under pressure to effect a flow of the heat curable resin therein to conform to the contoured surfaces of the male and female molds. The male and female mold sections are provided with suitable heating devices to heat the mold surfaces to a temperature usually ranging from about 250° to about 350° F. effecting a heating of the compressed composite moldable assembly and a curing of the resins therein. Molding cycles of about 2 to about 3 minutes is typical and the temperature and time will vary depending upon the specific resin employed, the type and quantity of catalyst and accelerators employed and the thickness of the webs of the member being molded. Upon completion of the cycle, the mold is opened and the integral composite member is removed and subjected to final trimming as may be desirable along the edges thereof to remove residual flash. The molded article can also be punched or drilled to provide slots and apertures at appropriate locations in accordance with the configuration illustrated in FIG. 1 of the drawings.

In addition to the structural member 12 as shown in FIG. 1, the present invention is also adaptable for producing a variety of fiber reinforced composite articles characterized by their low-weight and high-strength of which typical configurations are illustrated in FIGS. 6-11. As shown in FIG. 6, a leaf spring which has been exaggerated in thickness for the purposes of clarity is indicated at 56 formed with eyes 58 at the ends thereof and wherein the principal section is comprised of a glass fiber containing molding compound. To provide for reinforcement in high stress areas, a graphite fiber stratum or layer 60 with the fibers oriented uni-directionally parallel to the longitudinal axis of the leaf spring is provided in the central upper section thereof. Similarly, the eye sections 58 at the ends of the spring are further reinforced by graphite fiber layers 62.

FIG. 7 illustrates an inverted U-shaped channel member 64 predominantly comprised of a glass fiber resin matrix which is reinforced along the outer side flanges thereof by layers of graphite fiber integrally bonded in a compatible resin matrix to the underlying glass fiber reinforced resin matrix. Similarly, FIG. 8 illustrates a box-shaped channel 68 having a graphite fiber reinforcing layer 70 on the outer surface of the main horizontal flange thereof and supplemental graphite fiber reinforcing layers 72 extending along the side webs thereof.

FIG. 9 illustrates a tubular member 74 predominantly comprised of a glass fiber reinforced resin matrix having a layer of graphite fibers 76 in an integrally bonded resin matrix overlying all or a portion of the periphery thereof. FIG. 10 illustrates an angle member 78 predominantly comprised of a glass fiber reinforced resin matrix incorporating layers 80 of an integrally bonded resin matrix containing graphite fibers which extend uni-directionally along the flanges thereof. FIG. 11 illustrates an I-beam 82 predominantly comprised of a glass fiber reinforced resin matrix having graphite fiber reinforcing layers 84 integrally bonded over the upper and lower flanges thereof.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A method for forming a molded composite fiber reinforced member comprising the steps of providing a mold cavity of a desired configuration, placing a first sheet of a flowable heat curable resin containing glass fibers in the mold cavity, positioning at least one second sheet of a compatible flowable heat curable resin containing graphite fibers in overlying contacting relationship over a selected area of said first sheet less in area then said first sheet forming thereby a composite moldable assembly and applying pressure and heat to said moldable assembly to effect a compaction of said first and said second sheets and a contouring thereof to the configuration of the mold cavity and a curing of the resins therein to integrally bond said first and said second sheets together into an integral composite assembly.

2. The method as defined in claim 1 including the further step of forming said first sheet with chopped glass fibers disposed in random orientation.

3. The method as defined in claim 1 including the further step of forming said first sheet with glass fibers disposed in oriented selected directions to provide optimum strength.

4. The method as defined in claim 1 including the further step of forming said first sheet with a mixture of chopped glass fibers and continuous glass filaments.

5. The method as defined in claim 1 including the further step of forming said first sheet with a mixture of chopped glass fibers disposed in random orientation and continuous glass filaments oriented in selected directions.

6. The method as defined in claim 1 including the further step of controlling the quantity of said glass fibers in said first sheet to an amount up to about 80% by weight.

7. The method as defined in claim 1 including the further step of forming said second sheet with said graphite fibers oriented in a selected direction.

8. The method as defined in claim 1 including the further step of forming said second sheet with said graphite fibers in the form of continuous filaments disposed in an uni-directional oriented position.

9. The method as defined in claim 1 in which said graphite fibers in said second sheet are disposed in uni-directional oriented relationship and including the further step of positioning said second sheet with the uni-directional oriented said graphite fibers positioned to provide optimum physical properties of the integral composite assembly.

10. The method as defined in claim 1 including the further step of controlling the quantity of said graphite fibers in said second sheet to an amount up to about 75% by weight.

11. The method as defined in claim 1 in which a plurality of said second sheets are positioned over selected areas of said first sheet corresponding to those areas of anticipated high stress to which said integral composite assembly is to be subjected during service.

12. The method as defined in claim 1 including the further step of forming said first and said second sheets with the same said heat curable resin.

13. The method as defined in claim 1 including the further step of forming said first and said second sheet with a polyester-type said heat curable resin.

* * * * *